Aug. 17, 1926.

J. E. STEVENS 1,596,323

SPRING REPAIRING DEVICE

Original Filed Oct. 18, 1922

Patented Aug. 17, 1926.

1,596,323

UNITED STATES PATENT OFFICE.

JESSE E. STEVENS, OF LEBANON, INDIANA.

SPRING-REPAIRING DEVICE.

Original application filed October 18, 1922, Serial No. 595,356. Divided and this application filed April 24, 1923. Serial No. 634,357.

This invention relates to springs for vehicles, and particularly to a spring repairing means to be employed for emergency repairing of the broken leaves of springs, the invention being a division of my prior application, filed October 18, 1922, for spring repairing device, and bearing the Serial Number 595,356.

The particular object of the present invention is to produce a spring repairing device capable of use in connection with the repair of the leaves of springs where the break occurs at a point remote from the axle.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
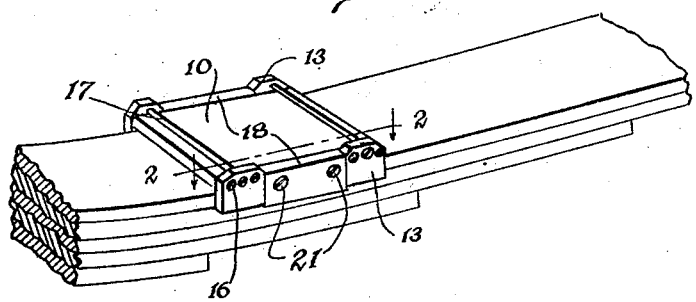
Fig. 1 is a perspective view of a fragment of a spring showing a device embodying the invention as used in repairing a spring leaf at a point remote from the axle.
Figure 2:
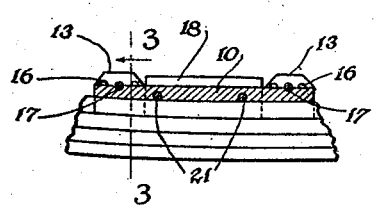
Fig. 2 is a section on the line 2—2 of Fig. 1.
Figure 3:
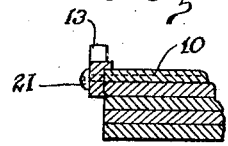
Fig. 3 is a section on the line 3—3 of Fig. 2.
Figure 4:
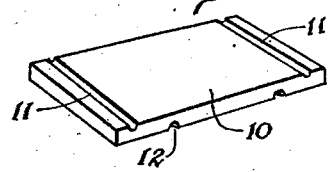
Fig. 4 is a perspective view of a plate employed in this form.
Figure 5:
Fig. 5 is a perspective view of a side guard used in connection with the invention.
Figure 6:
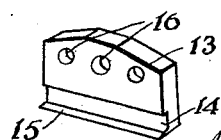
Fig. 6 is a perspective view of a clamp employed herewith.

In this embodiment of the invention where springs are to be repaired at points remote from the axle, there is provided a substantially flat plate 10 of such width as to cover the spring from side to side, and each end of this plate is transversely channelled at its upper surface, as indicated at 11, the under surface being similarly channelled at 12 at points more remote from the respective ends. In connection with this plate, there is employed certain clamping members 13, each having a channel 14 forming a seat for the edge of the leaf of the spring, the lower side of this channel having its flange 15 quite acutely sharpened so as to readily wedge between the leaves of the multiple leaf spring. Each of these clamps is provided with a bolt receiving opening 16, and bolts 17 pass through these openings over the plate 10, being received in the channels 11 whereby the clamps are prevented from longitudinal movement.

Between these clamps there are employed certain guards 18, each having a channel 19 similar to the channel in the clamps, and each being provided with a pair of bolt receiving openings 20, through which bolts 21 pass, these bolts extending from one side to the other of the plate 10, and lying in the channel 12.

It will be seen from the foregoing that when a broken spring is to be repaired, the plate 10 is placed thereon over the break, and the clamps and guards applied by means of their bolts, thus clamping the plate firmly on the spring and reenforcing it at the broken part.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

A device made in accordance with this invention, while primarily employed as a repairing device, is also of pronounced utility as a reinforcing device for a spring, serving to strengthen the spring without decreasing its flexibility. It also acts as a shock absorber, preventing excessive rebounding of the spring when the spring is subjected to unusual action. When the springs on each side of the automobile are supplied with the device embodying the invention, they prevent rocking of the automobile and the automobile will ride more smoothly and will run in a more direct line, without requiring action of the steering mechanism.

Having thus described the invention, what is claimed as new, is:

1. In a spring repairing device, a plate, clamping elements at each side of the plate, means for drawing the clamping elements into engagement with the edge of a spring, said plate and means being cooperatively arranged to prevent slipping of the plate with respect to the clamping elements, guards at opposite sides of the spring between the clamping elements on the respective sides, and means for drawing said guards together and forcing them into locking engagement with a spring leaf and said clamp.

2. In a repairing device for springs, a plate having guards in its upper surface near its end and similar guards in its under surface more remote from its ends, clamping members each having a channel to receive said plate and the leaf of a spring, said elements having bolt receiving openings therein registering with the grooves in the top of the plate, bolts passing through said openings and engaging in the registering grooves, guards having channels in their inner surface to receive the plate and the leaf of a spring, said guards being provided with bolt receiving openings registering with the channels in the bottom of the plate, and bolts passing through the last mentioned channels and the guards.

3. In a spring repairing device, rigid clamping members adapted to bridge the point of fracture of a leaf spring at the edges of the said leaf, and means for holding the clamping members against the edges of the said leaf.

4. In a spring repairing device, rigid clamping members adapted to bridge the point of fracture of a leaf spring at the edges of the said leaf, a plate adapted to lie on the surface of the leaf between the clamping members, and means for forcing the clamping members into engagement with the edges of the leaf and connecting them to the plate whereby the said clamping members and plate cooperate to retain fragments of the fractured leaf in operative positions with relation to each other.

JESSE E. STEVENS.